Fig. 1

INVENTOR.
George K. Newell
BY Allen W. Kyllonen
Attorney

Fig. 2

INVENTOR.
George K. Newell
BY Allen W. Kyllonen
Attorney

INVENTOR.
George K. Newell
BY Allen W. Kyllonen
Attorney

United States Patent Office 3,217,843
Patented Nov. 16, 1965

3,217,843
SPRING-APPLIED ELECTRIC POWER RELEASED
TREAD BRAKE UNIT
George K. Newell, Level Green, and Allen W. Kyllonen, Pittsburgh, Pa., assignors to Westinghouse Air Brake Company, Wilmerding, Pa., a corporation of Pennsylvania
Filed Jan. 2, 1964, Ser. No. 335,070
12 Claims. (Cl. 188—173)

This invention relates to electrically-controlled brake systems for railway rolling stock and, more particularly, to electrically-controlled brake systems employing so-called spring-applied power-released package brake assemblies wherein the brake mechanism is mounted on or contained in a casing for installation and removal as a unit.

In Patent No. 3,131,788 issued to George K. Newell, May 5, 1964, and assigned to the assignee of the present application, there is shown and described for railway rolling stock a brake assembly and a control system therefor, whereby the brakes are automatically spring applied to a degree dependent upon the degree of power applied or fully applied upon loss of power applied. In this brake assembly the brakes are normally maintained released by power means in the form of a hydraulic pressure actuated piston or an electrical torque motor, and are applied by a power spring of the clock or spiral type upon the removal of the releasing force exerted by the power means.

In order to provide for release of the brakes in case of loss of hydraulic pressure or failure of the torque motors on the respective cars, each car is provided with two hand pumps which can be respectively manually operated to supply hydraulic fluid from respective sumps through suitable piping and manually operated valves to the four brake assemblies associated with one truck of the car and to the four brake assemblies associated with the other truck of the car respectively. The cost of these two hand pumps, together with the piping and valves associated with each, increases the total cost of the brake equipment required for each car.

Furthermore, when a brake assembly of the spring-applied power-released type, as described in the hereinbefore-mentioned patent, is operated to effect a brake application, the parts of the mechanism comprising the brake assembly are subjected to a shock of considerable magnitude when a brake shoe carried by a brake head suspended by a brake-head hanger from a casing in which most of the mechanism is enclosed contacts the tread surface of a corresponding wheel of the car truck upon which the brake assembly is mounted. The repeated occurrence of such shocks upon each application of brakes causes rapid and extensive wear of the various parts of the mechanism, which wear is, of course, undesirable.

Accordingly, in order to avoid shock and wear to the various parts of the mechanism comprising a brake assembly of the spring-applied power-released type, as described in the above-mentioned copending patent application, it is the general purpose of this invention to provide a novel spring-applied power-released brake assembly having a yieldable connection or cushioning means interposed between a brake lever operatively connected to a brake-shoe-carrying brake head and a traveling nut mounted on a screw that is driven by an electrical torque motor to effect the windup of a spiral spring attached to the screw, which yieldable connection also functions to provide for limited manual rocking of the brake lever by a hand brake lever to effect a brake release subsequent to a power failure without inducing excessive stresses in the traveling nut and the screw upon which it is mounted.

A brake assembly of the above-mentioned type may be provided for each wheel of a railway car truck and the hand brake levers of the several brake assemblies connected together through a system of levers and links or cables and pulleys to the hand brake wheel at the corresponding end of the car so that, subsequent to an electric power failure, the spring forces acting to press the several brake shoes against their respective corresponding wheels may be manually simultaneously released or relieved, in order that the railway car may be moved to a railway shop for repair.

This invention comprises a novel package brake assembly for each individual wheel of a railway car truck wherein the brakes are normally maintained released by power means in the form of an electrical torque motor operably connected to a spiral spring for effecting the windup thereof and to a screw on which is mounted a traveling nut that has a yieldable connection, in the form of a cushioned spring means, with a brake lever that comprises a pivoted bell crank one arm of which is connected by a ball and socket joint to a brake rod pivotally connected at one end to a brake-shoe-carrying brake head and the other arm of which has a lost-motion connection with one arm of a second pivoted bell crank to the other arm of which may be manually applied a force for effecting, via the two bell cranks and the lost-motion connection therebetween, a release of the spiral spring brake-applying force upon loss of electrical power to the torque motor.

Figure 1:
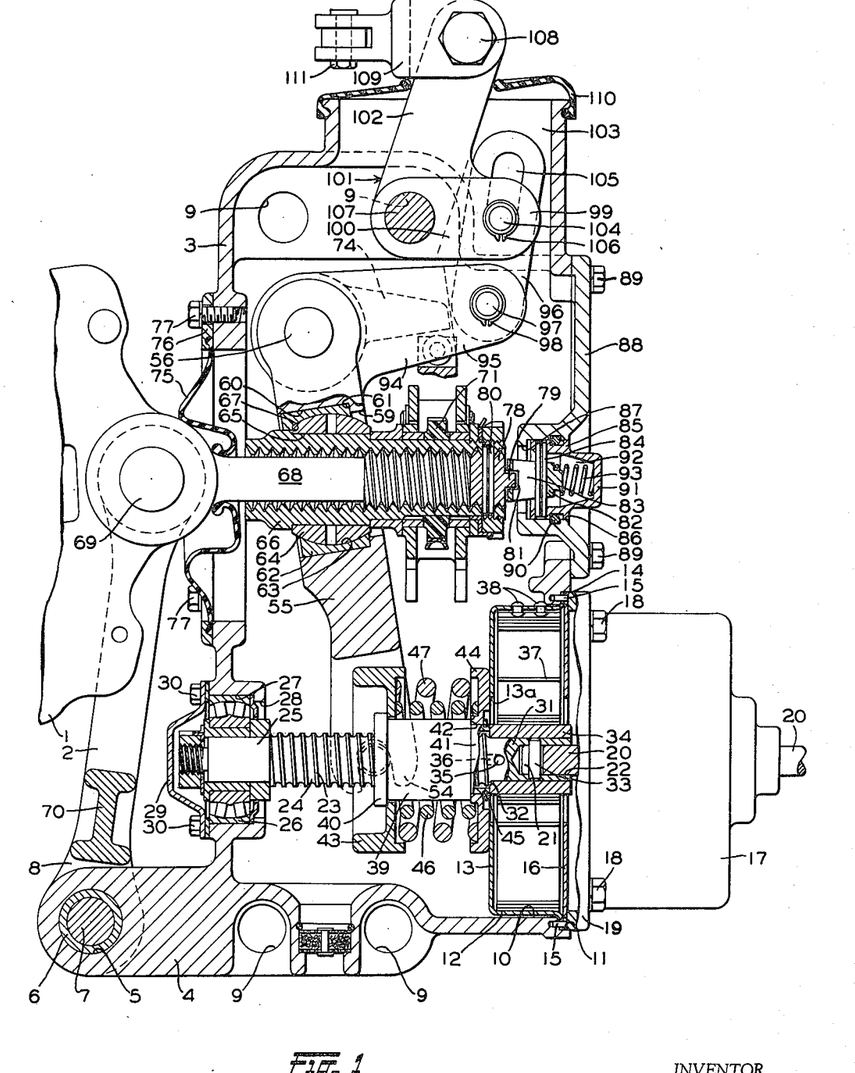
FIG. 1 is a vertical cross-sectional view of a brake assembly showing a spring-applied torque motor-released brake linkage together with a slack adjuster and a manual brake release mechanism therefor.
Figure 2:
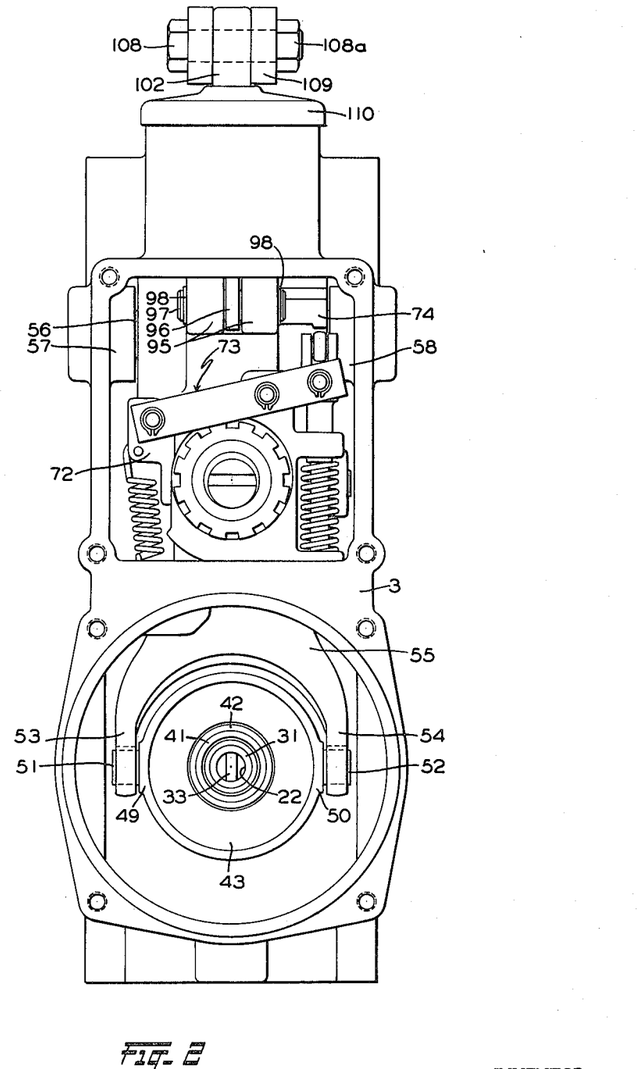
FIG. 2 is a right-hand end elevational view of the brake assembly shown in FIG. 1 with the torque motor, a spiral spring wound thereby, a spring case enclosing the spiral spring, and an end cover removed to show further structural details.
Figure 3:
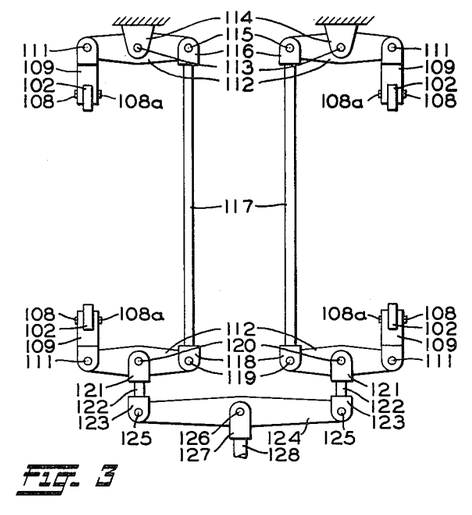
FIG. 3 is a schematic diagram of a lever system for effecting a simultaneous manual release of the brakes on a four-wheel (that is, two-axle) car truck, each wheel being provided with the brake assembly shown in FIG. 1.

*Description—FIGS. 1, 2 and 3*

As shown in FIG. 1 of the drawings, each of four brake assemblies associated respectively with the four wheels of one of two car trucks of each railway vehicle comprises a brake head 1 to which a brake shoe (not shown) is secured in the usual manner by a key (not shown), an external brake head hanger or actuating lever 2, and a sectionalized casing or support member comprising a main casing section 3 having formed intergral therewith a bracket 4 that has therein a bore 5 in which is press-fitted a bushing 6 in which is rotatably mounted a pin 7 that extends through the opposite jaws of a clevis 8 formed at the lower end of the actuating lever 2, whereby the actuating lever is pivotally mounted on the bracket 4. Each of two opposite parallel and spaced-apart sides of the casing section 3 is provided with four spaced-apart bores 9 that are coaxial with the corresponding bores in the other side, which bores are for receiving cap screws whereby the main casing section 3 may be rigidly secured to a pair of angle brackets (not shown) attached, as by welding, to the center sill or other transverse member (not shown) of a railway car truck frame.

Formed in the right-hand side wall of the main casing section 3 is a bore 10 and a coaxial counterbore 11. A spring case 12 that is open at its right-hand end and has an annular wall 13 at its left-hand end fits in the bore 10 in the right-hand side wall in the main casing section 3. The spring casing 12 has at one end an out-turned flange 14 which, as shown in FIG. 1, is disposed in the counterbore 11 and secured against rotation by means of a plurality of dowel pins 15, two of which appear in FIG. 1, that extend through a corresponding number of bores spaced apart about the periphery of the out-turned flange 14 and into corresponding counterbores formed in the casing 3. The open end of the spring case 12 is closed by an annular cover 16, the outer periphery of which fits against out-turned flange 14 and is provided with a corresponding number of bores through which extends the dowel pins 15 so that these dowel pins prevent rotation of both the spring case 12 and its annular cover 16 within the bore 10 and counterbore 11. The wall 13 of the spring case 12 has a bore 13a that is coaxial with the annular cover 16.

A troque motor 17 is secured to the right-hand side of the main casing section 3 by a plurality of cap screws 18, two of which appear in FIG. 1, that extend through a flange 19 formed integral with the housing of the torque motor 17 and have screw-threaded engagement with corresponding screw-threaded bores (not shown) formed in the main casing section 3.

The torque motor 17 is provided with an armature shaft 20 the left-hand end of which is provided with a slot 21 and is received in a counterbore 22 provided in the right-hand end of a screw 23 having a specially formed concave helical groove 24. The left-hand end of the screw 23 is provided with a reduced portion 25 that is mounted in a self-aligning roller bearing 26 that is carried in a counterbore 27 formed in the left-hand side wall of the main casing section 3 and coaxial with a bore 28 in this side wall through which the reduced portion 25 of the screw 23 extends. In order to prevent damage by dust and dirt to the self-aligning roller bearing 26, the outer end of the counterbore 27 is closed by a cover member 29 that is secured to the main casing section 3 by a plurality of cap screws 30, two of which appear in FIG. 1 of the drawings.

The right-hand end of the screw 23 is provided with a cylindrical portion 31 in which the hereinbefore-mentioned counterbore 22 is provided. This cylindrical portion 31 is of a reduced diameter which has at its left-hand end a shoulder 32 and which has a bore therein, the axis of which is at a right angle to and intersects the axis of the counterbore 22, in which bore is disposed a pin 33 that extends through the slot 21 in the armature shaft 20 and provides a driving connection between the armature shaft 20 and the screw 23. Disposed about the cylindrical portion 31 of the screw 23 and having its left-hand end resting against the shoulder 32 is a bushing or arbor 34 which is connected to the cylindrical portion 31 by a pin 35 carried by the cylindrical portion 31 of the screw 23 and having its opposite ends disposed in a slot 36 formed in the left-hand end of the bushing 34 so that this bushing is rotated simultaneously with the screw 23 upon rotation of the armature shaft 20 of the torque motor 17.

The periphery of the bushing or arbor 34 is provided with a slot (not shown) in which is received the inner end of a spiral spring 37 that is disposed within the spring case 12. As shown in FIG. 1, the outer end of the spiral spring 37 is secured to the spring case 12 by a pair of rivets 38 so that this outer end of the spiral spring is securely anchored to the spring case 12.

As shown in FIG. 1, the screw 23 has mounted thereon a traveling nut 39 which nut has formed internally a concave helical groove that corresponds to the helical groove 24 formed on the screw 23. A plurality of balls (not shown) is disposed in the groove 24 and the corresponding internal groove in the traleving nut 39. The traveling nut 39 is provided or fitted with a tubular ball guide (not shown) which interrupts the path of the balls, deflects them from the helical groove 24 and the corresponding groove in the traveling nut 39, guides them diagonally across the outside of the nut 39, and leads them back again into the helical groove 24 in the screw 23 and the corresponding helical groove in the traveling nut 39 at a point longitudinally spaced along the screw 23 from the point at which they leave the groove 24 to enter the ball guide. This arrangement forms a closed circuit through which the rolling balls, as the medium of engagement between the screw 23 and the traveling nut 39, recirculate continually as the screw 23 and traveling nut 39 are rotated relative to each other. Thus, the rotary motion of the screw 23 is changed to linear motion of the nut 39, or vice versa, with minimum frictional loss.

It should be understood that the screw 23 and the traveling nut 39 may be any suitable commercial type of ball bearing screw.

As can be seen from FIG. 1, the left-hand end of the traveling nut 39 is provided with a collar 40 and the right-hand end is provided with a portion 41 of reduced diameter at the left-hand end of which is a shoulder 42. The outer periphery of the traveling nut 39 is cylindrical and has slidably mounted thereon an annulus cup-shaped spring seat 43. Interposed between the right-hand side of the cup-shaped spring seat 43 and the left-hand side of an annular spring seat 44 mounted on the portion 41 of reduced diameter and held against the shoulder 42 by a snap ring 45 that is inserted in a groove formed in the reduced portion 41, are two cencentric springs 46 and 47 which are effective to bias the spring seat 43 toward the collar 40 on the left-hand end of the traveling nut 39. The caged value of these springs may be, for example, such as to provide a force in the range from 700 to 900 pounds which is sufficient to be effective in the manner hereinafter described to force a brake shoe carried by the brake head 1 against its corresponding wheel to effect the desired degree of braking.

As shown in FIG. 2, the spring seat 43 has formed integral therewith two diametrically and oppositively arranged bosses 49 and 50. Extending respectively from the bosses 49 and 50 and formed integral with the spring seat 43 are cylindrical members or trunnions 51 and 52 which are respectively straddled by U-shaped openings in legs 53 and 54 formed on the lower end of a brake lever 55 the upper end of which, as shown in FIG. 1, is pivotally mounted on a pin 56. The opposite ends of the pin 56 are carried in coaxial bores in a pair of oppositely arranged and inwardly facing bosses 57 and 58 (FIG. 2) formed on the opposite side walls of the main casing section 3.

The lever 55 has a bore 59 and a counterbore 60 (see FIG. 1) the axis of which is disposed at a right angle to and below the axis of the pin 56. Press-fitted into the counterbore 60 and having one end resting against a shoulder 61 formed at the right-hand end of counterbore 60 is a two-piece split bushing 62. Each half of the bushing 62 is provided with a cavity 63 in the form of a section of a sphere to form a seating surface for a member 64, the outer surface of which constitutes a zone of a sphere.

The member 64 is provided with a bore 65, the axis of which is also disposed at a right angle to and below the axis of the pin 56 and, when the member 64 is in the position shown in FIG. 1, at an acute angle to the axis of the bore 59. Disposed in the bore 65 with a light fit is an internally-threaded sleeve member 66 having adjacent its left-hand end, as seen in FIG. 1, a shoulder 67 against which abuts the left-hand end of member 64.

A brake rod 68, threaded at one end, has screw-threaded engagement with the internally-threaded sleeve member 66, and at the other end is pivotally connected to the brake head 1 and one end of the actuating lever 2, as by means of a bolt 69 and a nut (not shown). The brake head hanger or actuating lever 2 comprises two identical parallel links connected by a web 70 integral therewith so as to form below the web the clevis 8 which, as hereinbefore mentioned, is pivotally connected to the bracket 4 by the pin 7.

It is apparent from FIG. 1 that, as the braking surface of the brake shoe carried by the brake head 1 wears away, the travel of the brake rod 68 in the direction of the left hand will increase progressively with successive applications of the brakes. Therefore, in order to maintain the same travel distance of the brake rod 68, upon each subsequent application of the brakes as the brake shoe wears away, the brake assembly is provided with a slack take-up or adjusting mechanism which may be substantially the same as the slack adjusting mechanism described in the copending application Serial No. 322,103 of George K. Newell, filed Nov. 7, 1963, and assigned to the assignee of the present application.

Briefly, however, the slack adjusting mechanism comprises, in addition to the threaded portion of the brake rod 68 and the internally-threaded sleeve member 66 which has screw-threaded engagement with the threaded portion of the brake rod 68, a ratchet wheel 71 (FIG. 1) secured by a tongue and groove connection to the sleeve member 66 for rotation therewith, a pawl 72 (FIG. 2) for effecting rotation of the ratchet wheel 71 and sleeve member 66, a spring-biased pawl operating linkage 73, and an arm 74 formed integral with the brake lever 55 for operating the linkage 73 to cause the pawl 72 to effect rotation of the ratchet wheel 71 and sleeve member 66 to increase the length of the brake rod 68 as the brake shoe carried by the brake head 1 wears away.

As shown in FIG. 1, the left-hand end of the brake rod 68 extends through a suitable opening in the left-hand wall of the main casing section 3 to the exterior thereof. In order to prevent the entrance of water, ice and dirt to the interior of the main casing section 3, a rubber boot 75 surrounds the opening in the left-hand wall of the casing section 3. The opposite ends of the boot 75 are provided with beads which fit, respectively, around the periphery of the brake rod 68 and in a groove formed in an annular plate 76 that is secured to the main casing section 3, as by a plurality of cap screws 77.

The brake assembly of the present invention is further provided with a manual slack adjusting mechanism which will now be described.

A plug 78 having a tongue 79 is screw threaded into the right-hand end of sleeve member 66 and locked in place by a pin 80 that extends through corresponding bores in the sleeve member 66 and the plug 78. The tongue 79 is disposed in a corresponding slot 81 formed on a tapered key 82 that is provided with a second slot 83 through which extends a pin 84 that has its opposite ends carried in coaxial bores formed in a cylindrical wrench-receiving member 85 that is rotatably mounted in a counterbore 86 that is coaxial with a bore 87 formed in a cover member 88 that closes an opening in the right-hand wall of the main casing section 3 and is secured thereto by a plurality of cap screws 89, two of which appear in FIG. 1 of the drawings. The wrench-receiving member 85 is provided with a peripheral annular groove in which is partly disposed an O-ring seal 90 that is partly disposed in a corresponding groove formed in the cover member 88. The O-ring seal 90 releasably secures the wrench-receiving member 85 to the cover member 88 and also allows the wrench-receiving member 85 to rotate with respect to the cover member 88. Furthermore, O-ring seal 90 prevents the entrance of dirt, ice and water into the interior of the main casing section 3. The wrench-receiving member 85 is further provided with a hexagon 91 for receiving a wrench. Disposed in a cavity 92 formed in the wrench-receiving member 85 and interposed between the wrench-receiving member 85 and the tapered key 82 is a spring 93 that is effective to bias the right-hand end of the slot 83 in the key 82 against the pin 84.

In case of a power failure to the torque motor 17, in order to provide for releasing or relieving the spring force pressing the brake shoe carried by the brake head 1 against the tread surface of its corresponding wheel, the brake lever 55 is connected to a manually operable linkage, which will now be described.

As shown in FIG. 1 of the drawings, the upper end of the brake lever 55 is provided with a second arm 94 formed integral therewith that is substantially parallel to the arm 74. The outer or right-hand end of the arm 94 is provided with a clevis 95 between the jaws of which is disposed one end of a link 96 that is connected to the clevis 95 as by a pin 97. Adjacent each of its ends, the pin 97 is provided with a peripheral annular groove in which is inserted a snap ring 98, which snap rings serve to prevent removal of the pin 97.

The link 96 is also disposed between the jaws of a second clevis 99 formed on one arm 100 of a bell crank lever 101 that has a second arm 102 that extends through an elongated opening 103 formed in the top of the main casing section 3. The link 96 has a lost-motion connection with the arm 100 of the bell crank 101 by means of a pin 104 which extends through the opposite jaws of the clevis 99 and an elongated slot 105 formed in the link 96 adjacent the upper end thereof, as viewed in FIG. 1. The pin 104, like the pin 97, is provided adjacent each of its ends with a peripheral annular groove in which is inserted a snap ring 106, which snap rings serve to prevent removal of the pin 104.

The bell crank lever 101 is rockably mounted on the main casing section 3 by means of a cap screw 107 that extends through one pair of coaxial bores 9 in the two opposite parallel and spaced-apart sides of the main casing section 3, which cap screw is one of four cap screws by which the main casing section 3 may be rigidly secured to the pair of angle brackets hereinbefore mentioned which are attached to the center sill or other transverse member of the railway car truck frame.

The arm 102 of the bell crank lever 101 may be connected, as by means of a bolt 108 and a nut 108a (FIG. 2), to one pair of jaws of a double clevis 109, the other pair of jaws of which is connected in a manner hereinafter described to the hand brake wheel which is located at one end of a railway car. A rubber boot 110 surrounds the arm 102 of the bell crank lever 101. The opposite ends of the boot 110 are provided with beads which fit, respectively, against the surface of arm 102 and in a groove formed in the main casing section 3.

Figure 4:
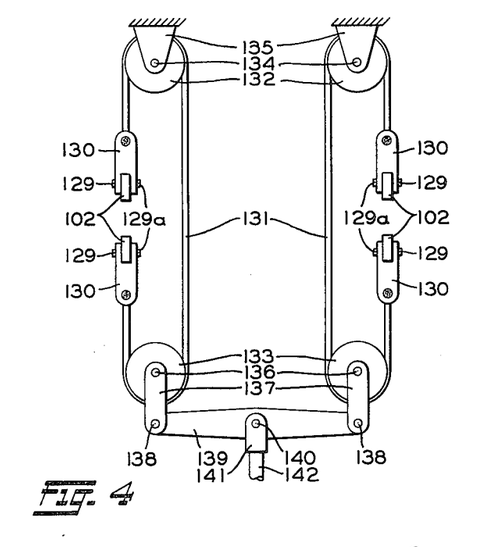
FIG. 4 is a schemaatic diagram of a cable and pulley system for effecting a simultaneous manual release of the brakes on a four-wheel (that is, two-axle) car truck, each wheel being provided with the brake assembly shown in FIG. 1.

Each four-wheel (that is, two-axle) truck of a railway car is provided with four brake assemblies constructed as shown in FIGS. 1 and 2 of the drawings, one brake assembly for each wheel of the truck. The arms 102 of the bell crank levers 101 of the four brake assemblies for each truck may be connected to the hand brake wheel which is located at the corresponding end of the car either through a system of levers and links, as shown in FIG. 3 of the drawings, or through a system of cables and pulleys, as shown in FIG. 4.

Referring to FIG. 3 of the drawings, it will be seen that the arm 102 of the bell crank lever 101 of each of the four brake assemblies is connected by a bolt 108 and a corresponding nut 108a to one pair of jaws of a double clevis 109, the other pair of jaws of which is connected, as by means of a bolt 111 and a nut (not shown), to one end of a lever 112. Each of the two upper levers 112 shown in FIG. 3 is pivotally mounted substantially midway its length on a pin 113 the opposite ends of which are anchored in the opposite jaws of a clevis 114 that is formed on a bracket that may be welded or otherwise secured to the frame of the car truck. The other end of each of the two upper levers 112 is connected, as by a bolt 115 and a nut (not shown), to a correponding clevis 116 formed at the upper end of one of two identical links 117. Each of the two links 117 has formed at its lower end a clevis 118 that is connected, as by a bolt 119 and a nut (not shown), to the other end of one of the two lower levers 112, shown in FIG. 3.

Each of the two lower levers 112 shown in FIG. 3 is pivotally mounted substantially midway its length on a pin 120 the opposite ends of which are anchored in the opposite jaws of a clevis 121 formed at the upper end of one of two identical links 122. Each of the two identical links 122 has formed at its lower end a clevis 123 which is pivotally connected to a corresponding end of an equalizing lever 124, as by means of a pin 125 that has its opposite ends anchored in the jaws of the respective clevis 123.

The equalizing lever 124 is pivotally connected substantially midway its length, as by means of a bolt 126 and a nut (not shown), to a clevis 127 formed at the upper end of a link 128. The link 128 may be connected, as for example, by a chain (not shown), to the hand brake wheel which is located at the hereinbefore-mentioned corresponding end of the car.

Description—FIG. 4

When the arms 102 of the bell crank levers 101 of the four brake assemblies of each truck are connected to the hand brake wheel located at the corresponding end of the car through a system of cables and pulleys, it will be seen from FIG. 4 that the arm 102 of the bell crank lever 101 of each of the four brake assemblies is connected, as by a bolt 129 and a corresponding nut 129a, to a pair of jaws of a clevis formed at one end of a link 130 that is provided adjacent its opposite end with a bore into which is received one end of one of a pair of cables 131, the respective one end of the respective cable being secured to the corresponding link by being welded thereto. Each of the cables 131 passes around two pulleys 132 and 133, as shown in FIG. 4 of the drawings.

Each of the pulleys 132 is rotatably mounted on a pin 134 the opposite ends of which are anchored in the opposite jaws of a clevis 135 that is formed on a bracket that may be welded or otherwise secured to the frame of the car truck.

Each of the pulleys 133 is rotatably mounted on a pin 136 the opposite ends of which are anchored respectively in the upper end of one of a pair of identical spaced-apart parallel links 137 that are connected adjacent their lower ends, as by a pin 138, to a correpsonding end of an equalizing lever 139.

The equalizing lever 139 is pivotally connected substantially midway its length, as by means of a bolt 140 and a nut (not shown), to a clevis 141 formed at the upper end of a link 142. The link 142 may be connected, as for example, by a chain (not shown), to the hand brake wheel which is located at the hereinbefore-mentioned corresponding end of the car.

Operation

When the torque motor 17 (FIG. 1) is supplied with current through a power supply circuit (not shown), this torque motor is rendered effective to rotate its armature shaft 20. Since the armature shaft 20 is connected to the cylindrical portion 31 of the screw 23 by means of the pin 33 that extends through the slot 21 in the armature shaft 20 and has its opposite ends anchored in the cylindrical portion 31, the armature shaft 20 rotates the screw 23. Upon rotation of the screw 23, as just described, the traveling nut 39 will travel along the screw 23 in the direction of the right hand until the spring seat 44 abuts the wall 13 of spring case 12, the nut 39 carrying with it the lower end of the brake lever 55, thereby correspondingly shifting the rod 68 and brake head 1 to the normal brake release position in which the brake shoe (not shown) on the brake head disengages the tread of the associated vehicle wheel. It will be seen that the traveling nut 39 is restrained from rotation by the cooperative relation of the springs 46 and 47, of the two spring seats 43 and 44 bewteen which these springs are interposed, and of the brake lever 55, the slots in the legs 53 and 54 constituting the lower bifurcated end of lever 55 straddling the diametrically disposed trunnions 51 and 52 integral with the spring seat 43 and the spring seat 44 being secured on the traveling nut 39 by the snap ring 45. Since the spring seat 44 now abuts the wall 13 of the spring case 12, the nut 39 cannot travel along the screw 23 any farther in the direction of the right hand. Consequently, the torque motor 17 is stalled in the brake release position of the brake lever 55. Furthermore, this rotation of the screw 23 effects rotation of the bushing or arbor 34 which is connetced thereto by the pin 35, to wind up or tighten the spiral spring 37 about the bushing or arbor 34 as the brake lever 55 is rocked to its release position by movement of the traveling nut 39 in the direction of the right hand along the screw 23.

It should be understood that the torque motor 17 is provided with sufficient heat radiation capacity that it may remain in a stalled condition for an indefinite period of time in which the brakes are released without overheating the torque motor. Since the brake lever 55 is rocked to its brake release position when the right-hand side of the spring seat 44 is moved into abutting relationship with the wall 13 of the spring case 12, it will be understood that the brake shoe carried by the brake head 1 is moved away from the corresponding wheel to effect a release of the brakes on that wheel.

In operation, when it is desired to effect a light brake application, the operator of the leading vehicle in the train effects a reduction of the degree of energizing current supplied to the torque motor 17 to cause a corresponding reduction in the output torque of this torque motor. Consequently, upon this reduction in the output torque of the torque motor 17, there is insufficient force to maintain the spiral spring 37 in its completely wound position. Therefore, when the output torque of the torque motor 17 is reduced in the manner just explained, the corresponding spiral spring 37 unwinds partially to release the stored energy in the spring until the remaining stored energy in the spring balances the reduced output torque of the torque motor 17. As the spiral spring 37 unwinds to release the stored energy therein, this spiral spring effects rotation of the bushing or arbor 34 since the inner end of the siral spring 37 is received in a splot in the bushing. Since the bushing 34 is connected to the corresponding reduced portion 31 of the screw 23 through the pin 35 and slot 36, the rotation of the bushing 34 effects rotation of the cylindrical portion 31 of the screw 23 and thereby rotation of the screw 23 in the self-aligning roller bearing 26. This rotation of the screw 23 by the spring 37 is effective to cause the traveling nut 39 to travel along the screw 23 in the direction of the left hand, as viewed in FIG. 1, since the force of the springs 47 and 46 acting on the spring seat 44 carried on the portion of reduced diameter 41 of the traveling nut 39 and the spring seat 43, the trunnions 51 and 52 of which are respectively straddled by the U-shaped openings in the legs 53 and 54 of the lower end of the brake lever 55, prevent turning of the traveling nut 39. Therefore, as the traveling nut 39 in the brake assembly travels in the direction of the left hand along the corresponding screw 23, the traveling nut 39 effects rocking of the brake lever 55 in a clockwise direction about the pin 56. Since the brake lever 55 in the brake assembly is pivotally connected to the corresponding brake rod 68 by means of the ball or universal joint formed by the two-piece split bushing 62 and the member 64, this clockwise rocking of the brake lever 55 is effective to move the brake rod 68 in the direction of the left hand to bring the brake shoe carried by the brake head 1 into braking contact with the corresponding wheel to effect a braking action on this wheel.

When it is desired to release the brake application, the operator of the leading vehicle in the train effects a restoration of energization of the torque motor 17 until this motor is supplied with maximum current whereupon the torque output of the torque motor 17 will increase to its maximum value. Consequently, the torque motor 17 will now, through its armature shaft 20, pin 33 and cylindrical portion 31 of the screw 23, rotate the screw 23 to move the traveling nut 39 therealong in the direction of the right hand, as viewed in FIG. 1, until the brake lever 55 is rocked, as viewed in FIG. 1, in a counterclockwise direction to its brake release position, it being noted that movement of the traveling nut 39 is transmitted through the spring seats 43 and 44 and springs 46 and 47 to the lever 55, and to wind up the spiral spring 37 until it is completely wound, it being noted that the cylindrical portion 31 is connected by the pin 35 and slots 36 to the bushing 34 to which one end of the spiral spring 37 is anchored. At this time, the spring seat 44 will abut the wall 13 of the spring case 12. The brake will now remain released as long as the torque motor 17 is supplied with maximum current.

Now let it be supposed that while the brakes are released, the operator of the leading vehicle in the train desires to effect a heavier brake application than was effected in the manner just described.

To do so, he will effect a greater reduction of the degree of energizing current supplied to the torque motor 17 than when the above-described light brake application was effected to cause a corresponding greater reduction in the output torque of the torque motor 17. When the output torque of the torque motor 17 is thus reduced, the output torque of the torque motor 17 is insufficient to maintain the spiral spring 37 in its completely wound position. Therefore, when the torque output of the torque motor 17 is reduced in the manner just explained, spiral spring 37 unwinds to release the stored energy in the spring until the remaining stored energy balances the output torque of the torque motor 17. As the spiral spring 37 unwinds to release the stored energy therein, this spiral spring effects rotation of the screw 23 to cause movement of the traveling nut 39 therealong in the direction of the left hand, as viewed in FIG. 1, to effect corresponding clockwise rocking of the brake lever 55 to cause an application of brakes in the manner hereinbefore described in detail. It should be noted that a greater braking force is applied to the wheel than was applied when effecting a light brake application, as previously described, since the output torque of the torque motor 17 is reduced more than it was when the light brake application was effected.

When it is desired to release this moderately heavy brake application, the operator effects a restoration of energization of the torque motor 17 until this motor is supplied with maximum current whereupon the brake shoe carried by the brake head 1 will be moved away from its corresponding wheel in the manner hereinbefore described in connection with effecting the release of the brake after a light brake application.

Let it now be supposed that the operator of the train desires to effect a full brake application. To effect a full brake application, the operator effects a reduction in the degree of energizing current supplied to the torque motor 17 until no current is supplied to the torque motor 17 whereupon the output torque of this torque motor is reduced to zero. Therefore, upon the cutoff of the supply of electric current to the torque motor 17, the spiral spring 37 unwinds to release the stored energy in this spring and effects a full application of the brakes. Consequently, the full force of the spiral spring 37 is effective to force the corresponding brake shoe carried by the brake head 1 against the corresponding wheel to provide a maximum braking force on the wheel.

Should brake shoe wear occur while a brake application is in effect, the hereinbefore-mentioned slack adjusting mechanism operates in the manner described in the hereinbefore-mentioned copending application Serial No. 322,103 to take up slack or compensate for this brake shoe wear.

If, for any reason, the electric power supply on any one car in a train should fail, the respective spiral spring 37 of each one of the four brake assemblies for each of the two four-wheel trucks at each end of the car will effect a brake application on the corresponding wheel. The four inoperative brake assemblies of the respective car truck located at one or the other end of the car may be manually released, in a manner which will now be described in detail.

Let it be supposed that the four inoperative brake assemblies of the truck located at one end of the car are connected to the hand brake wheel located at the corresponding end of the car through the system of levers and links shown in FIG. 3 of the drawings. To effect a manual release of the four inoperative brake assemblies located at the one end of the car, the hand brake wheel at the corresponding end of the car will be rotated in the direction to exert, through the chain and link 128, a force on the bolt 126 that acts in a downward direction, as viewed in FIG. 3 of the drawings. This force exerted on the bolt 126 is transmitted through the equalizing lever 124 to each of the pins 125 which connect the respective end of the equalizing lever 124 to a corresponding one of the links 122 that, in turn, is connected by the corresponding pin 120 to one of the two lower levers 112 midway the ends thereof. Therefore, one-half of the force exerted on the link 128 is transmitted to each one of the pins 120.

One-half the force exerted on each pin 120 is transmited through the corresponding lower lever 112 to the corresponding bolt 111 at one end of this lever and the other half of this force is transmitted to the corresponding bolt 119 at the opposite end. The force thus exerted on the bolt 111 is transmitted through the corresponding double clevis 109 and bolt 108 to the lower left-hand arm 102, shown in FIG. 3, and the force thus exerted on the pin 119 is transmitted to the upper left-hand arm 102, shown in FIG. 3, via the left-hand link 117, the corresponding bolt 115, upper left-hand lever 112, corresponding pin 111 and double clevis 109. Likewise, the equal forces exerted on the bolts 111 and 119 adjacent the respective ends of the lower right-hand lever 112 are transmitted respectively to the lower right-hand arm 102 and the upper right-hand arm 102, shown in FIG. 3.

From the foregoing, it is apparent that rotation of the hand wheel in a brake-applying direction transmits an equal force to the arm 102 of the bell crank lever 101 of each of the four brake assemblies of the car truck located at the one end of the car.

It should be apparent that if the four brake assemblies of the car truck located at the other end of the car are connected to the hand brake wheel at the other end of the car through the system of cables and pulleys, shown in FIG. 4 of the drawings, rotation of this hand brake wheel in a brake-applying direction will transmit an equal force to the arm 102 of the bell crank lever 101 of each of the four brake assemblies of the car truck located at the other end of the car.

Referring to FIG. 1 of the drawings, it will be apparent that the force transmitted from the hand brake wheel to the arm 102 of the bell crank lever 101 is effective to rock it counterclockwise about the cap screw 107. As the bell crank lever 101 is thus rocked counterclockwise, the pin 104 is carried in the clevis 99 formed on the end of the arm 100 of the bell crank lever 101 is moved upward within the elongated slot 105 formed in the link 96 until the pin 104 abuts the upper end of the elongated slot 105. As the bell crank lever 101 continues to be rocked counterclockwise, subsequent to the pin 104 abutting the upper end of the elongated slot 105, the pin 104 is effective to exert an upward pull on the link 96 the lower end of which is connected by the pin 97 to the clevis 95 formed on the end of the arm 94 of the brake lever 55. Therefore, a force is transmitted from the pin 104 to the brake lever 55, via the link 96, pin 97 and arm 94, which force acts in the direction to effect counterclockwise rocking of the brake lever 55 about the pin 56 against the yielding resistance of the springs 46 and 47 that are interposed between the spring seat 44 mounted on the portion 41 of the traveling nut 39 and the spring seat 43 slidably mounted on the traveling nut 39 and operably connected to the brake lever 55 through the trunnions 51 and 52 (FIG. 2) formed integral with the spring seat 43. Since spring seat 43 is slidably mounted on the traveling nut 39, and the springs 46 and 47 are yieldable or compressible, the force transmitted from the pin 104 to the brake lever 55 is effective to rock it counterclockwise about the pin 56 against the yielding resistance of springs 46 and 47 sufficiently to relieve or release the force of spiral spring 37 pressing the brake shoe carried by the brake head 1 against its corresponding wheel and transmitted from the brake lever 55 to the brake head 1 through the pivotal connection between the brake lever 55 and the internally-threaded sleeve member 66 that has screw-threaded engagement with the brake rod 68 which is pivotally connected to the brake head 1 and actuating lever 2 by means of the bolt 69.

Inasmuch as operation of each of the four brake assemblies is the same, it will be apparent that rotation of the hand brake wheel in a brake releasing direction effects a simultaneous release of the braking force acting on each wheel of the truck.

Accordingly, should the electric power supply on any car in a train fail and thereby cause the spiral spring 37 in each of the eight brake assemblies on the car to force the brake shoe carried by the corresponding brake head 1 against the respective one of the wheels, the spring force acting on each of the four wheels of the car truck at one end of the car can be simultaneously released by manually rotating the hand brake wheel located at the coresponding end of the car in a brake-applying direction, and then the spring force acting on each of the four wheels of the car truck at the opposite end of the car can be simultaneously released in the same manner.

Subsequent to manually releasing the spring force acting on each of the eight wheels of the car in the manner just described, the car can be moved to a railway shop for repair.

It may be noted that the parts of the mechanism comprising each brake assembly are not subject to a violent or severe shock each time the brake shoe carried by the brake head 1 is moved into contact with the tread surface of its corresponding wheel since, upon the brake shoe contacting its corresponding wheel, the springs 46 and 47 provide a yieldable connection or cushioning means interposed between the brake lever 55 and the traveling nut 39 which allows the traveling nut 39 to travel along the screw 23 a short distance after the brake shoe has been brought into contact with the tread surface of the wheel, it being understood that the spring seat 44 which is carried on the portion of reduced diameter 41 if the traveling nut 39 moves with the traveling nut and compresses the springs 46 and 47 since the spring seat 43, which is connected to the brake lever 55 via the trunnions 51 and 52 and the legs 53 and 54 of the lever 55, remains stationary subsequent to the brake shoe contacting the tread surface of the wheel. Since the parts of the brake assembly are thus not subject to a severe shock each time a brake application is effected, wear of these parts is greatly reduced which correspondingly legnthens their useful life.

Having new described the invention, what we claim as new and desire to secure by Letters Patent, is:

1. A package brake assembly for a vehicle wheel comprising, in combination:
   (a) brake shoe means for applying a braking force to a vehicle wheel,
   (b) a pivoted lever effective upon rocking in one direction to apply said brake shoe means against the vehicle wheel, and upon rocking in the opposite direction to move said brake shoe means away from the vehicle wheel, and
   (c) means for actuating said pivoted lever including:
      (i) a screw-threaded member rotatably mounted for rotation in oposite directions on its longitudinal axis,
      (ii) spiral spring means connected to said screw-threaded member so as to be rotarily wound up upon rotation of said screw-threaded member in one direction and potentially effective when wound up to exert a force to rotate said screw-threaded member in the opposite direction,
      (iii) a traveling nut travelable on said screw-threaded member in opposite directions according to the direction of rotation of the screw-threaded member,
      (iv) resilient means providing a yieldable connection between said pivoted lever and said traveling nut whereby movement of said traveling nut along said screw-threaded member in one direction effects rocking of said pivoted lever in its said one direction and vice versa, and whereby said traveling nut can travel a limited distance in said one direction along said screw-threaded member relative to said lever, subsequent to application of said brake shoe means to the vehicle wheel, to prevent undue stresses in said screw-threaded member and said traveling nut, and
      (v) power means for rotating said screw-threaded member in said one direction to cause travel of said traveling nut in a direction to rock, through the intermediary of said resilient means, said pivoted lever to release said brake shoe means and to maintain it there and at the same time to cause windup of said spring means.

2. A package brake assembly for a wheel of a railway vehicle truck comprising, in combination:
   (a) a support member adapted to be fixed to a vehicle truck frame,
   (b) brake shoe means movably carried by said support member for movement into and out of braking engagement with a wheel of the railway vehicle truck,
   (c) a lever pivotally mounted on said support member and effective upon rocking in one direction to move said brake shoe means into braking engagemeans with the wheel of the vehicle truck, and upon rocking in the opposite direction to move said brake shoe means in a brake releasing direction away from the wheel, and
   (d) means for actuating said lever including:
      (i) a screw-threaded member rotatably mounted on said support member for rotation in opposite directions on its longitudinal axis,
      (ii) spiral spring means connected to said screw-threaded member so as to be rotarily wound up upon rotation of said screw-threaded member in one direction and potentially effective when wound up to exert a force tending to rotate said screw-threaded member in the opposite direction, (iii) a traveling nut travelable on said screw-threaded member in opposite directions according to the direction of rotation of the screw-threaded member, (iv) resilient means providing a yieldable connection between said lever and said traveling nut whereby movement of said traveling nut along said screw-threaded member in either direction effects rocking of said lever in a corresponding direction, and whereby said traveling nut can travel a limited distance along said screw-threaded member relative to said lever, subsequent to application of said brake shoe means to the vehicle wheel, to prevent undue stresses in said screw-threaded member and said traveling nut, and (v) power means carried by said support member and effective when enregized for rotating said screw-threaded member in said one direction to cause travel of said traveling nut in a direction to rock, through the intermediary of said resilient means, said lever to release said brake shoe means and to maintain it there and at the time to cause windup of said spring means, and effective when deenergized to render said spring means active to effect a brake application.

3. A package brake assembly for a vehicle wheel comprising, in combination:
(a) brake shoe means for applying a braking force to a vehicle wheel,
(b) a bell crank lever means pivoted at its knee and having two angularly-spaced arms, one of said arms being operatively connected to said brake shoe means, said bell crank lever means being rockable in one direction to apply said brake shoe means against the vehicle wheel and rockable in the opposite direction to move said brake shoe means away from the vehicle wheel,
(c) a first means for actuating said bell crank lever including:
(i) a screw-threaded member rotatably mounted for rotation on its longitudinal axis,
(ii) spiral spring means connected to said screw-threaded member so as to be rotarily wound up upon rotation of said screw-threaded member in one direction and effective when wound up to exert a force tending to rotate said screw-threaded member in the opposite direction,
(iii) a traveling nut travelable on said screw-threaded member,
(iv) resilient means providing a yieldable connection between said one arm of said bell crank lever means and said traveling nut whereby movement of said traveling nut along said screw-threaded member in opposite directions effects rocking of said bell crank lever means in a corresponding direction, and
(v) power means for rotating said screw-threaded member in said one direction to cause travel of said traveling nut in a direction to rock, through the intermediary of said resilient means, said bell crank lever means to release said brake shoe means and to maintain it there and at the same time to cause windup of said spring means, and
(d) a second means for exerting a force on the other of said arms of said bell crank lever means whereby said bell crank lever means is caused to rock in said opposite direction against the yielding resistance of said resilient means to relieve the braking force exerted on said brake shoe means by said spring means, thereby to release the brake application independently of said power means.

4. A package brake assembly, as claimed in claim 3, further characterized in that said second means for applying a force to the other of said arms of said bell crank lever means comprises manually operable lever means.

5. A package brake assembly, as claimed in claim 3, further characterized in that said second means for exerting a force on the other of said arms of said bell crank lever means comprises:
(a) a second bell crank lever means pivoted at its knee and having two angularly-spaced arms,
(b) means for applying a manual force to one arm of said second bell crank lever means for rocking it in one direction, and
(c) means including a lost-motion connection between the respective other arms of said two bell crank lever means whereby movement of said one arm of said first-mentioned bell crank lever means in response to movement of said traveling nut in one of said directions along said screw-threaded member effected by unwinding of said spring means occurs independently of said second means and without effecting rocking of said second bell crank lever means.

6. A package brake assembly, as claimed in claim 5, further characterized in that said means including a lost-motion connection between the other arms of said two bell crank lever means comprises:
(a) a link having a slot adjacent one end and a bore adjacent the opposite end,
(b) a first pin extending through the bore in said link and being anchored in the other arm of said first-mentioned bell crank lever means, and
(c) a second pin extending through the slot in said link and being anchored in the other arm of said second bell crank lever means, said second pin and the slot in said link providing for limited rocking of either of said bell crank lever means without effecting rocking of the other.

7. A package brake assembly, as claimed in claim 1, further characterized in that said resilient means comprises:
(a) a first annular spring seat slidably mounted on said traveling nut adjacent one end thereof and provided with a trunnion connection with said pivoted lever,
(b) a second annular spring seat fixedly mounted on the end of said traveling nut opposite said one end, and
(c) a spring member interposed between said first and said second spring seats for biasing said first spring seat to a limit stop position on said traveling nut whereby movement of said traveling nut in one direction along said screw-threaded member is effective through the intermediary of said spring member and said spring seats to cause rocking of said pivoted lever in said one direction to apply said brake shoe means against the vehicle wheel, said spring member being yieldable to provide for limited additional travel of said traveling nut along said screw-threaded member subsequent to the appplication of said brake shoe means against the vehicle wheel.

8. A package brake assembly, as claimed in claim 1, further characterized in that said power means comprises a torque motor having a shaft coaxially and detachably connected to said screw-threaded member.

9. A package brake assembly for applying a braking force to a wheel of a railway car truck, said brake assembly comprising, in combination:
(a) a support member fixed with respect to the car truck and having a bracket,
(b) an actuating lever pivotally mounted adjacent one end on the bracket,
(c) a brake-shoe-carrying brake head operatively connected to said actuating lever adjacent its opposite end,
(d) a brake lever pivotally mounted on said support member and operatively connected to said brake-shoe-carrying brake head to move said brake-shoecarrying brake head against the vehicle wheel upon rocking of said brake lever in one direction, (e) a screw-threaded member rotatably mounted on said support member for rotation on its longitudinal axis, (f) a traveling nut travelable on said screw-threaded member, (g) resilient means providing a yieldable connection between said brake lever and said traveling nut whereby movement of said traveling along said screw-threaded member in opposite directions effects rocking of said brake lever in a corresponding direction, (h) a spiral spring having one end anchored to said screw-threaded member, (i) a spring casing enclosing said spiral spring and to which the other end of said spiral spring is anchored, said spring casing being carried by said support member, (j) a torque motor secured to said support member and having a shaft in coaxial operative relation to said screw-threaded member whereby said torque motor is effective to rotate said screw-threaded member in one direction in opposition to the force exerted by said spiral spring, to effect, respectively, windup of said spiral spring, and movement of said traveling nut along said screw-threaded member in the direction to rock said brake lever in a brake releasing direction, and (k) said spiral spring being effective upon relaxation of torque on said screw-threaded member by said torque motor to unwind and thereby rotate said screw-threaded member in an opposite direction to cause movement of the traveling nut therealong in a direction to effect rocking of said brake lever in said one direction to effect a brake application.

10. In combination:
(a) a plurality of package brake assemblies respectively associated with different wheels of a railway vehicle truck, each of which assemblies comprises:
  (i) brake shoe means for applying a braking force to a corresponding wheel of the railway vehicle truck,
  (ii) pivoted lever means operatively connected to said brake shoe means and being rockable in one direction to apply said brake shoe means against the corresponding wheel and rockable in the opposite direction to move said brake shoe means away from the wheel,
  (iii) a screw-threaded member rotatably mounted for rotation in opposite directions on its longitudinal axis,
  (iv) spring means connected to said screw-threaded member so as to be wound up upon rotation of said screw-threaded member in one direction and potentially effective, when wound up, to exert a force to rotate said screw-threaded member in the opposite direction,
  (v) a traveling nut travelable on said screw-threaded member in opposite directions according to the direction of rotation of said screw-threaded member,
  (vi) resilient means providing a yieldable connection between said pivoted lever means and said traveling nut whereby movement of said traveling nut along said screw-threaded member in one direction effects rocking of said pivoted lever means in its said one direction and vice versa, and whereby said traveling nut can travel a limited distance in said one direction along said screw-threaded member, subsequent to application of said brake shoe means to the corresponding vehicle wheel, to prevent undue stresses in said screw-threaded member and said traveling nut,
  (vii) power means for rotating said screw-threaded member in said one direction to cause travel of said traveling nut in a direction to rock, through the intermediary of said resilient means, said pivoted lever means to release said brake shoe means and to maintain it there, and, at the same time, to cause windup of said spring means, and
  (viii) mechanical means for rocking said pivoted lever means in said opposite direction against the yielding resistance of said resilient means to relieve the braking force exerted on said brake shoe means by said spring means thereby to release the brake application independently of said power means, and
(b) a manually operable means for applying simultaneously an equalized force to each of said mechanical means.

11. In combination:
(a) a plurality of package brake assemblies respectively associated with different wheels of a railway vehicle wheel truck, each of which assemblies comprises:
  (i) brake shoe means for applying a braking force to a corresponding wheel of a vehicle,
  (ii) a bell crank lever means pivoted at its knee and having two angularly-spaced arms, one of said arms being operatively connected to said brake shoe means, said bell crank lever means being rockable in one direction to apply said brake shoe means against the vehicle wheel and rockable in the opposite direction to move said brake shoe means away from the wheel,
  (iii) a screw-threaded member rotatably mounted for rotation on its longitudinal axis,
  (iv) spring means connected to said screw-threaded member so as to be wound up upon rotation of said screw-threaded member in one direction and effective when wound up to exert a force tending to rotate said screw-threaded member in the opposite direction,
  (v) a traveling nut travelable on said screw-threaded member,
  (vi) resilient means providing a yieldable connection between said one arm of said bell crank lever means and said traveling nut whereby movement of said traveling nut along said screw-threaded member in opposite directions effects rocking of said bell crank lever means in a corresponding direction,
  (vii) power means for rotating said screw-threaded member in said one direction to cause travel of said traveling nut in a direction to rock, through the intermediary of said resilient means, said bell crank lever means to release said brake shoe means and to maintain it there, and, at the same time, to cause windup of said spring means, and
  (viii) mechanical means operatively connected to the other of said two arms of said bell crank lever means for rocking said bell crank lever means in said opposite direction against the yielding resistance of said resilient means to relieve the braking force exerted on said brake shoe means by said spring means, thereby to release the brake application independently of said power means, and
(b) a manually operable means for applying simultaneously an equalized force to each of said mechanical means.

12. The combination, as claimed in claim 10, further characterized in that said manually operable means comprises:
(a) a manually operable actuating rod,
(b) an equalizing lever operably connected substantially midway its ends to said manually operable actuating rod,
(c) first lever means for connecting one end of said equalizing lever to the said mechanical means of certain of said plurality of package brake assemblies,
(d) second lever means for connecting the other end of said equalizing lever to the said mechanical means of the remainder of said plurality of package brake assemblies, and
(e) said first and said second lever means cooperating with said equalizing lever whereby to transmit substantially equal forces from said manually operable actuating rod to the mechanical means of each respective package brake assembly to relieve the braking force exerted on the corresponding brake shoe means by the corresponding spring means thereby to relieve the brake application independently of the corresponding power means.

References Cited by the Examiner
UNITED STATES PATENTS 1,272,038  7/1918  Halsey ____________ 188—173

ARTHUR L. LA POINT, *Primary Examiner.*
DUANE A. REGER, *Examiner.*

UNITED STATES PATENT OFFICE
CERTIFICATE OF CORRECTION

Patent No. 3,217,843                                        November 16, 1965

George K. Newell et al.

It is hereby certified that error appears in the above numbered patent requiring correction and that the said Letters Patent should read as corrected below.

Column 12, lines 60 and 61, for "engagemeans" read -- engagement --; column 15, line 10, after "traveling" insert -- nut --.

Signed and sealed this 25th day of October 1966.

(SEAL)
Attest:

ERNEST W. SWIDER                                       EDWARD J. BRENNER
Attesting Officer                                          Commissioner of Patents